United States Patent [19]

Ray

[11] 4,056,722

[45] Nov. 1, 1977

[54] SHAFT POSITION SENSOR

[75] Inventor: Earnest Joseph Ray, Mountain View, Calif.

[73] Assignee: Dictaphone Corporation, Rye, N.Y.

[21] Appl. No.: 727,870

[22] Filed: Sept. 29, 1976

[51] Int. Cl.² ............................................. G01D 5/34
[52] U.S. Cl. ........................ 250/231 SE; 250/237 G; 116/DIG. 21
[58] Field of Search ................ 324/175; 350/285, 319; 250/229, 231 SE, 237 G; 356/196; 331/94.5 Q; 340/282; 116/DIG. 21

[56] References Cited
U.S. PATENT DOCUMENTS

| 3,217,623 | 11/1965 | Hotchkiss | 350/285 |
| 3,328,112 | 6/1967 | Soales et al. | 350/285 |
| 3,361,912 | 1/1968 | Lundberg | 350/319 |

Primary Examiner—M. Tokar
Attorney, Agent, or Firm—Limbach, Limbach & Sutton

[57] ABSTRACT

Shaft position sensing apparatus includes a group of generally parallel vanes extending generally longitudinally of the shaft axis, means for mounting the vanes in that relationship and attaching them to the shaft for rotation with the shaft, a light source providing a beam of light directed transversely of the shaft axis against the vanes, and a light sensor aligned with the light beam and positioned on the opposite side of the shaft axis from the light source for receiving varying amounts of light dependent upon the angular position of the shaft.

8 Claims, 6 Drawing Figures

A.

B.

C.

SHAFT POSITION SENSOR

BACKGROUND OF THE INVENTION

For numerous mechanical and electromechanical applications it is necessary to determine the angular position of a shaft for control and other purposes. Conventional techniques for such shaft position determination have included the use of magnetic pick-ups, the combination of a light source with a tachometer wheel and an interdigitated series of light sensors, and various arrangements featuring the combination of a fixed light polarizer interacting with a polarized plate rotating coaxially with the shaft. While each of these techniques has performed satisfactorily in various applications, such apparatus has generally been bulky and complex and overly expensive.

SUMMARY OF THE INVENTION

It is an object of this invention to provide apparatus which is small and simple for sensing the angular position of a shaft. It is a further object of this invention to provide such a shaft position sensing apparatus which provides an electrical output signal which indicates such shaft position.

Briefly, this invention relates to such apparatus which comprises a group of generally parallel vanes extending in a direction generally longitudinally of the shaft axis, vane mounting means for maintaining the group of vanes in their relationships with one another and with the shaft, this mounting means being attached to the shaft for rotation therewith, a light source and a light sensor. The light source is positioned on one side of the shaft and projects a beam of light transversely of shaft axis aganinst the vanes at a point adjacent the shaft axis. The light sensor is aligned with the light beam and positioned on the opposite side of the shaft axis from the light source for receiving light from the light beam. By this arrangement the light received by the sensor is passed between the vanes such that the amount of light received by the sensor varies with the angle between the light beam and the vanes, such that the angular position of the shaft may be determined by the relative amount of light received by the sensor. In a preferred embodiment of the invention the shaft vanes are opaque, and the vane mounting means is a transparent plate within which the vanes are imbedded.

DESCRIPTION OF A PREFERRED EMBODIMENT

Figure 1:
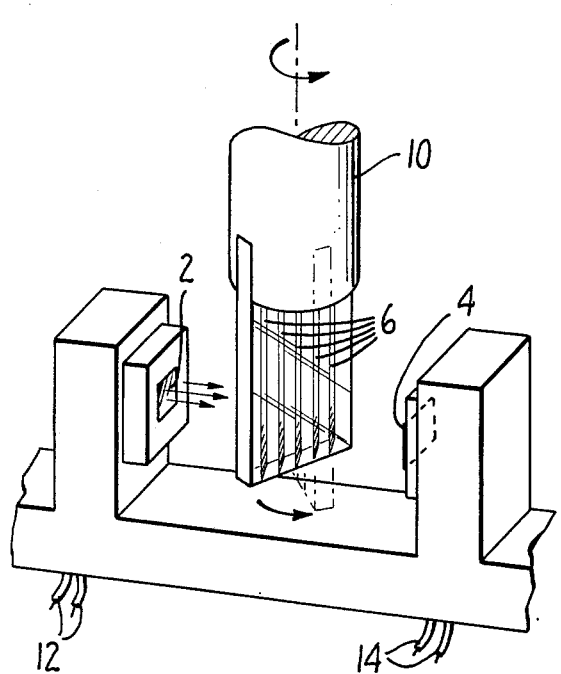
FIG. 1 is a pictorial view of the apparatus of this invention.
Figure 3:
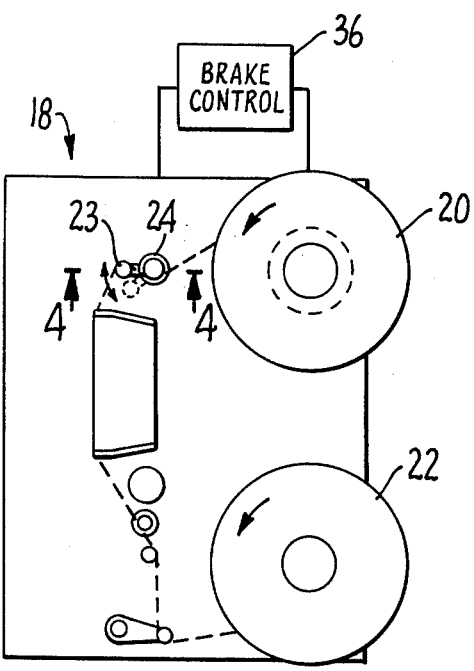
FIG. 3 is a schematic representation of a tape recorder in which the apparatus of this invention may be included as a tape tension controlling mechanism.
Figure 4:
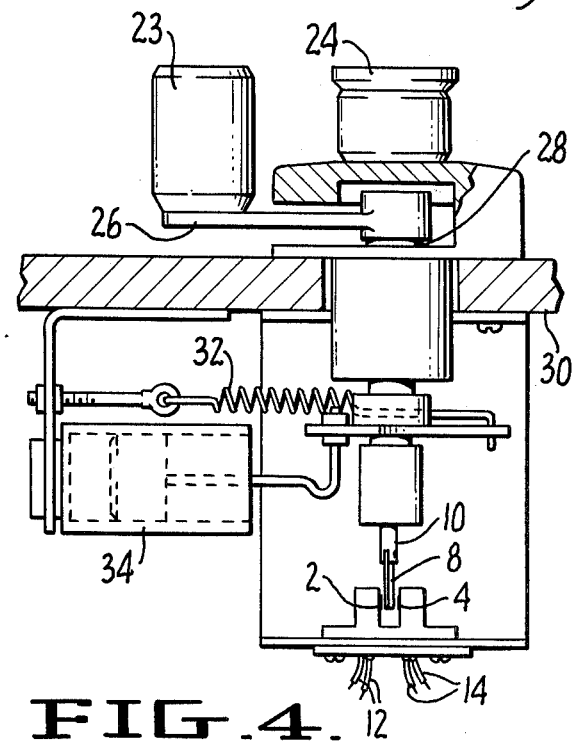
FIG. 4 is a side elevation of an enlarged view of the tape tension control of FIG. 3, taken along line 4—4 of FIG. 3.

The shaft position sensing apparatus of this invention is illustrated most clearly in FIG. 1. To illustrate one of numerous possible applications of this invention, it is also illustrated in FIGS. 3 and 4 incorporated into a tape recorder tape tension control, as will be described below.

The basic components of this apparatus are illustrated in FIG. 1. These components comprise generally a light source 2 directing a beam of light toward light sensor 4, a plurality of vanes 6 held in mounting means such as the transparent plate 8, which is attached to the end of the rotatable shaft 10.

The light source 2 and light sensor 4 conveniently may be incorporated into a single unit such as the General Electric photon coupled interrupter module H13B1 or H13B2. These modules incorporate a gallium arsenide solid state light emitter coupled with a silicon photo-darlington in a single housing, with a gap between providing for interruption and modulation of the light beam passing therebetween. Suitably, the input power through leads 12 to the light emitter 2 is maintained constant, maintaining the light output substantially constant. Thus, the output of the high gain photodetector 4, from leads 14 attached thereto, may be caused to vary proportionally by varying the amount of light reaching the detector 4 from the light source 2.

Figure 2:
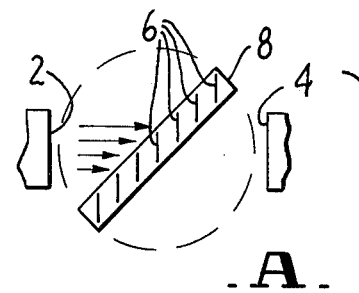
FIGS. 2A, B and C are schematic representations of the apparatus of FIG. 1 with the vanes and their mounting member rotated to various orientations; ;p
Figure 2:
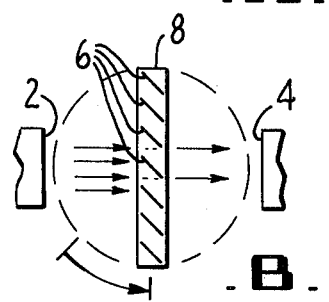
Figure 2:
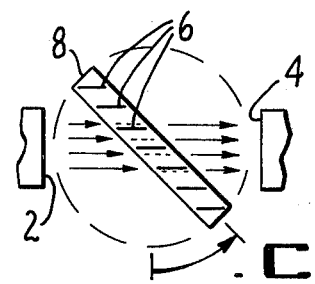

The means for varying the amount of light passing between the light source 2 and the detector 4 is illustrated most clearly in FIGS. 1 and 2. A transparent plate 8 is attached to the end of the shaft of interest 10 for rotation with the shaft. Imbedded within that plate are a plurality of vanes 6 which may be either normal to the broad surface of the plate or at some angle thereto. Preferably, the vanes are opaque and oriented at an acute angle, suitably of about 45°, to the surface of the plate, as illustrated in FIGS. 2A, B and C, although other angles less than 90° may also be used. As may be seen, the vanes are generally parallel to one another, extending in a direction generally longitudinally of the shaft axis and are arranged in a pattern extending transversely of the shaft axis. Conveniently, the vane and mounting means arrangement may comprise material such as that known as light control film sold by the 3M Company. In this preferred embodiment the vanes are dimensioned and spaced such that, when the plate 8 is turned to orient the vanes generally normal to the direction of the light beam from light emitter 2, the light path to the detector 4 is completely blocked, permitting no light to pass, as illustrated in FIG. 2A. Conversely, when the plate 8 is rotated by shaft 10 to a position 90° to that of FIG. 2A, the vanes will be aligned with the light beam, causing substantially no blockage of the light and permitting most of it to reach the detector 4, as illustrated in FIG. 2C. At any orientation between the two extremes of FIGS. 2A and 2C, such as is illustrated in FIG. 2B, some predetermined portion of the amount of light passed in the orientation of FIG. 2C will be allowed to pass to the detector 4. Since the electrical signal output of detector 4 is proportional to the amount of light received by it from light source 2, this proportional amount of light will thus be translated into a proportional electrical signal from photodetector leads 14. Thus, the output of the detector 4 may be seen to vary with the angular position of the shaft 10 to which the plate 8 and thus the vanes 6 are mounted. While FIGS. 2A–C illustrate the operation of the sensing apparatus through only a 90° angle of rotation, it should be apparent that similar operation could be provided throughout each 180° of rotation, for a shaft rotating in multiples of 180°.

One of numerous suitable applications for the apparatus of this invention is illustrated in FIGS. 3 and 4. In this illustrative application the shaft position sensing apparatus of the invention is used to control the tape tension in a tape recorder 18. In this recorder the tape passing between supply reel 20 and take-up reel 22 is threaded around a spring-biased, pivotable idler assembly 23 and guide 24. This pivotally mounted idler assembly 23 may suitably pivot between the position of the solid line representation of FIG. 3 and that of the phantom line position. The idler roller 25 is mounted to arm 26 which in turn is mounted to pivot shaft 28, which is journaled in a bearing fixed to the recorder deck 30. The idler arm and roller assembly 23 is biased toward the phantom line position of FIG. 3 by a spring 32 of predetermined and adjustable tension. The tension in the recording tape is maintained by a controllable brake acting upon the supply reel 20, providing an adjustable amount of drag. The tension of spring 32 is adjusted such that, when the proper amount of brake drag is applied to the supply reel 20, the idler assembly 23 will be maintained in a position intermediate the two extreme positions illustrated in FIG. 3. If insufficient drag is applied to the supply reel 20, the biasing spring 32 will cause the idler assembly to pivot to the extreme position illustrated in phantom in FIG. 3. Conversely, if the brake drag were too great, applying too great a tension to the recording tape, the tape would pull the idler assembly around to the position illustrated by the solid lines of FIG. 3. In FIG. 4 it may be noted that a dash pot assembly 34 is also attached to the idler shaft 28 to damp the swinging of the arm 26 from these tape tension variations.

In this application the shaft position sensing apparatus is utilized to control the brake acting on the supply reel 20. The output of the photodetector 4 is applied to the brake control 36 such that, when the idler assembly 23 is pivoted to the phantom line position, indicating excessive tension in the recording tape, the signal from the photodetector to the brake control 36 effects a reduction in the brake drag. Conversely, when the idler assembly has pivoted to the position indicated in the solid line representation of FIG. 3, indicating insufficient tension in the recording tape, the detector signal to the brake control 36 effects an increase in the supply reel brake drag. The signal is adjusted such that, when the idler assembly is at its desired intermediate position, indicating the preferred tape tension, the signal from the photodetector 4 to the brake control 36 will cause the brake drag to be maintained substantially constant at the level until some variation in the tape tension occurs.

From the foregoing it may be seen that this invention provides shaft position sensing apparatus which is both compact and simple. While one particularly preferred embodiment has been described in detail, along with an illustrative application, it is to be understood that these descriptions are intended solely to be illustrative of the principles of the invention and are not to be limitative thereof. Accordingly, since numerous variations and modifications to this apparatus, all within the scope of the invention, will readily occur to those skilled in the art, the scope of this invention is to be limited solely by the claims appended hereto.

I claim:
1. Shaft position sensing apparatus comprising
a group of generally parallel vanes with each said vane extending in a direction generally longitudinally of said shaft axis and said group arranged in a pattern extending transversely of said shaft axis;
vane mounting means for maintaining said group of vanes in said relationships with one another and with said shaft, said vane mounting means being attached to said shaft for rotation with said shaft;
a light surce positioned on one side of said shaft and having a beam of light directed transversely of said shaft axis against said vanes at a point adjacent said shaft axis; and
a light sensor aligned with said light beam and positioned on the opposite side of said shaft axis from said light source for receiving light from said light beam, whereby light received by the sensor is passed between the vanes such that the amount of light received by the sensor varies with the angle between the light beam and the vanes such that the angular position of the shaft may be determined by the relative amount of light received by the sensor and indicated by the sensor output.

2. Shaft position sensing apparatus according to claim 1 wherein said vanes are opaque, whereby the light received by the light sensor is that light which passes between the vanes.

3. Shaft position sensing apparatus according to claim 2 wherein said vanes are positioned and dimensioned such that, when said shaft is in at least one said angular position, said vanes block all light from passing to said sensor.

4. Shaft position sensing apparatus according to claim 1 wherein said vanes are positioned at an acute angle with respect to said vane mounting means.

5. Shaft position sensing apparatus according to claim 4 wherein said acute angle is about 45°.

6. Shaft position sensing apparatus according to claim 1 wherein said vane mounting means comprises a transparent plate member to which said vanes are joined.

7. Shaft position sensing apparatus according to claim 6 wherein said group of vanes is imbedded within said transparent plate member.

8. Shaft position sensing apparatus comprising
a transparent plate member extending parallel to and aligned with said shaft and attached to said shaft for rotation therewith;
a plurality of generally parallel opaque vanes imbedded in said plate member and extending generally longitudinally of said shaft;
a light source positioned on one side of said transparent plate member and having a beam of light directed toward said plate member at a point adjacent said shaft axis; and
a light sensor positioned on the opposite side of said plate member from said light source for and aligned with said light beam receiving light from said light beam, whereby light received by the sensor from the light source must be passed through the plate member and between the vanes such that the amount of light received by the sensor varies with the angle between the light beam and the vanes such that angular position of the shaft may be determined by the relative amount of light received by the sensor.

* * * * *